(12) United States Patent
Wieschemann et al.

(10) Patent No.: US 11,524,851 B2
(45) Date of Patent: *Dec. 13, 2022

(54) SYSTEM FOR TRANSPORTING CONTAINERS, PARTICULARLY ISO CONTAINERS, USING HEAVY GOODS VEHICLES

(71) Applicant: Konecranes Global Corporation, Hyvinkää (FI)

(72) Inventors: Armin Wieschemann, Oberhausen (DE); Heiko Schulz, Leverkusen (DE)

(73) Assignee: Konecranes Global Corporation, Hyvinkää (FI)

( * ) Notice: Subject to any disclaimer, the term of this patent is extended or adjusted under 35 U.S.C. 154(b) by 1022 days.

This patent is subject to a terminal disclaimer.

(21) Appl. No.: 16/312,783

(22) PCT Filed: Jun. 21, 2017

(86) PCT No.: PCT/EP2017/065171
§ 371 (c)(1),
(2) Date: Dec. 21, 2018

(87) PCT Pub. No.: WO2017/220629
PCT Pub. Date: Dec. 28, 2017

(65) Prior Publication Data
US 2020/0307924 A1 Oct. 1, 2020

(30) Foreign Application Priority Data

Jun. 22, 2016 (DE) .................. 102016111450.2

(51) Int. Cl.
*B65G 63/00* (2006.01)
*G06Q 10/08* (2012.01)
*G08G 9/02* (2006.01)

(52) U.S. Cl.
CPC ......... *B65G 63/004* (2013.01); *G06Q 10/083* (2013.01); *G08G 9/02* (2013.01); *B65G 2201/0235* (2013.01)

(58) Field of Classification Search
CPC . B65G 63/004; B65G 2201/0235; G08G 9/02
(Continued)

(56) References Cited

U.S. PATENT DOCUMENTS 6,321,138 B1 * 11/2001 Livesay ............... B65G 1/0414
700/215
9,546,054 B1 1/2017 Ward
(Continued)

FOREIGN PATENT DOCUMENTS

CN 1769592 * 5/2006 ............... E01C 1/02
CN 1980844 A 6/2007
(Continued)

OTHER PUBLICATIONS

Preliminary Report on Patentability of the International Searching Authority in English from corresponding Patent Cooperation Treaty (PCT) Application No. PCT/EP2017/065171, completed Nov. 14, 2018.
(Continued)

*Primary Examiner* — Lynn E Schwenning
(74) *Attorney, Agent, or Firm* — Gardner, Linn, Burkhart & Ondersma LLP

(57) ABSTRACT

A system for transporting containers using heavy goods vehicles having a separate operating region in which the heavy goods vehicles can be operated includes at least one first lane for at least one external heavy goods vehicle, and at least one second lane for at least one internal heavy goods vehicle are reserved in the separate operating region. The heavy goods vehicles can be operated together in a mixed traffic situation, and the first and second lanes are each
(Continued)

guided through a transition region of a handling unit of a storage region and each arranged laterally in relation to the storage region.

20 Claims, 8 Drawing Sheets

(58) Field of Classification Search
USPC .................................................. 414/139.4
See application file for complete search history.

(56) References Cited

U.S. PATENT DOCUMENTS

| | | | |
|---|---|---|---|
| 10,621,537 | B2 | 4/2020 | Ben-Alexander |
| 11,040,839 | B2 * | 6/2021 | Wieschemann ...... G05D 1/0289 |
| 2001/0032032 | A1 | 10/2001 | Matsumoto |
| 2002/0059075 | A1 | 5/2002 | Schick et al. |
| 2002/0130065 | A1 | 9/2002 | Bloom |
| 2004/0199285 | A1 | 10/2004 | Berichon et al. |
| 2005/0060070 | A1 | 3/2005 | Kapolka et al. |
| 2006/0011721 | A1 | 1/2006 | Olsen, III et al. |
| 2006/0045659 | A1 | 3/2006 | Hubbard |
| 2006/0251498 | A1 | 11/2006 | Buzzoni et al. |
| 2008/0213073 | A1 | 9/2008 | Benedict et al. |
| 2011/0188975 | A1 | 8/2011 | Salmoiraghi |
| 2013/0236279 | A1 | 9/2013 | Franzen et al. |
| 2015/0081582 | A1 | 3/2015 | Mains, Jr. |
| 2016/0054735 | A1 | 2/2016 | Switkes et al. |
| 2019/0193959 | A1 | 6/2019 | Wieschemann et al. |
| 2020/0001733 | A1 | 1/2020 | Wieschemann et al. |
| 2020/0156627 | A1 | 5/2020 | Wieschemann et al. |
| 2020/0223647 | A1 | 7/2020 | Pollak Von Emhofen |

FOREIGN PATENT DOCUMENTS

| | | |
|---|---|---|
| CN | 103910200 A | 7/2014 |
| CN | 104192576 A | 12/2014 |
| CN | 104822573 A | 8/2015 |
| DE | 1708715 A1 | 7/1971 |
| DE | 1459786 A1 | 10/1971 |
| DE | 102008061198 A1 | 6/2010 |
| DE | 102010009323 A1 | 8/2011 |
| DE | 102012108768 A1 | 3/2014 |
| EP | 2189572 A2 | 5/2010 |
| EP | 2390746 A2 | 11/2011 |
| EP | 2637954 B1 | 6/2014 |
| EP | 2694424 B1 | 6/2015 |
| JP | 2000044063 A | 11/1999 |
| JP | 2003292167 A | 10/2003 |
| JP | 2003292168 A | 10/2003 |
| JP | 2009196777 A | 9/2009 |
| JP | 2014196162 A | 10/2014 |
| JP | 2015193434 A | 11/2015 |
| NL | 1005562 C1 | 9/1998 |

OTHER PUBLICATIONS

International Search Report of the International Searching Authority from corresponding Patent Cooperation Treaty (PCT) Application No. PCT/EP2017/065171, indicated completed on Oct. 11, 2017.
Written Opinion of the International Searching Authority from corresponding Patent Cooperation Treaty (PCT) Application No. PCT/EP2017/065171, indicated completed on Oct. 11, 2017.
International Preliminary Examination Report from corresponding Patent Cooperation Treaty (PCT) Application No. PCT/EP2017/065171, dated Nov. 14, 2018.

* cited by examiner

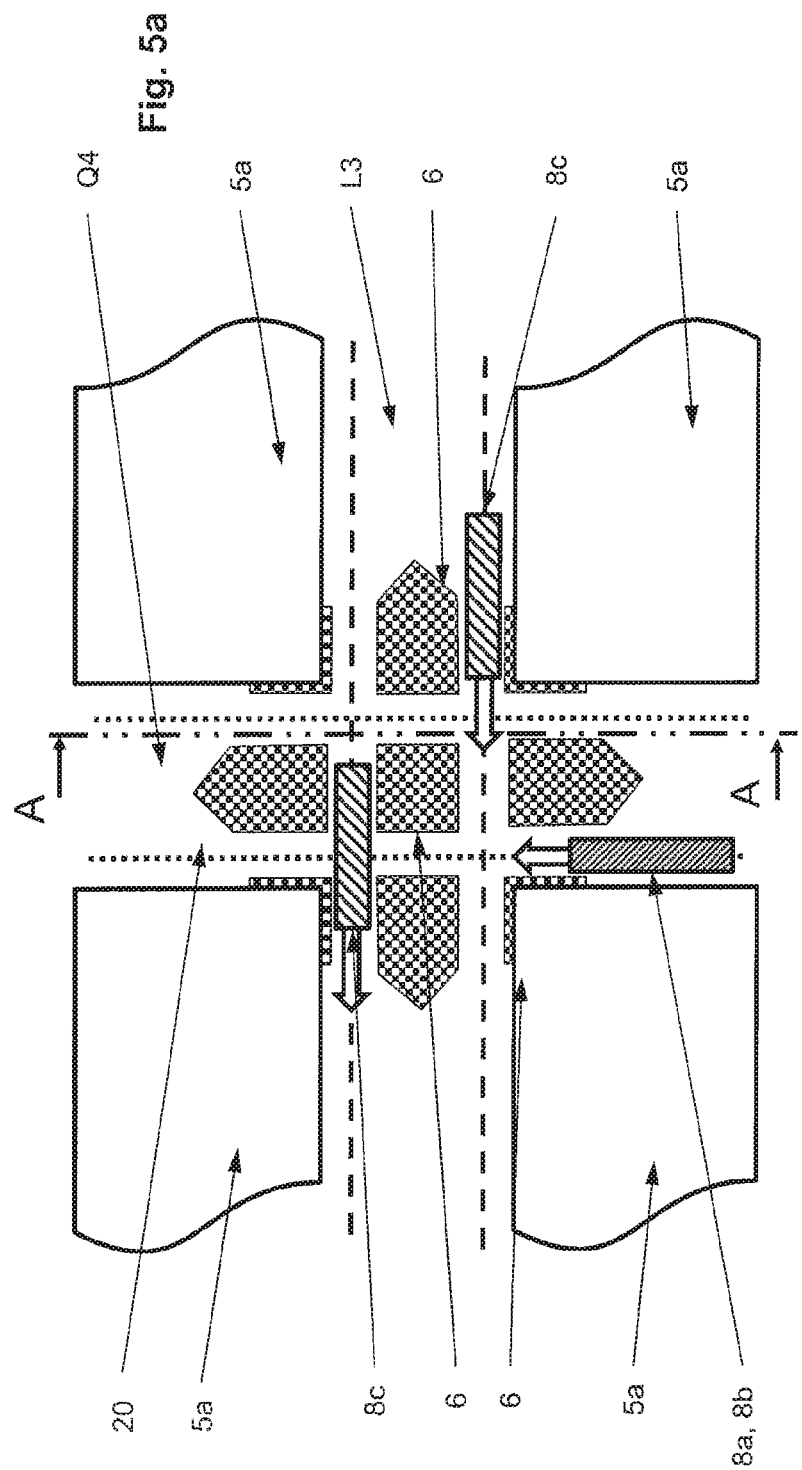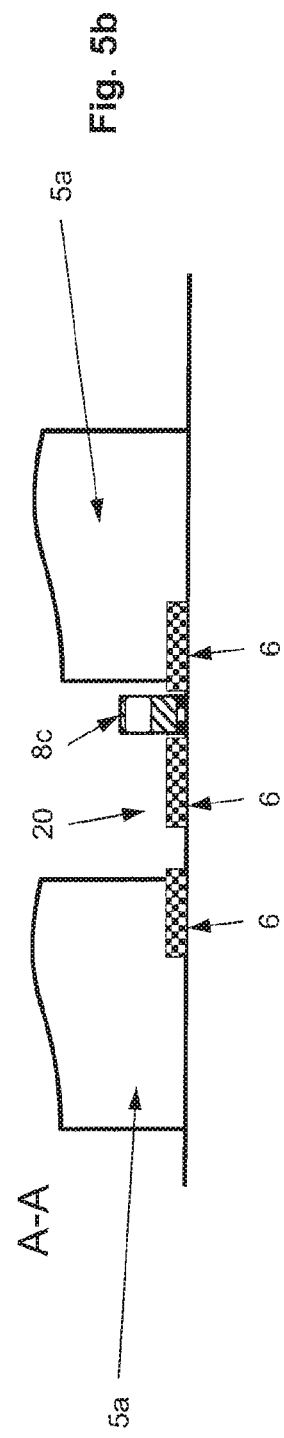

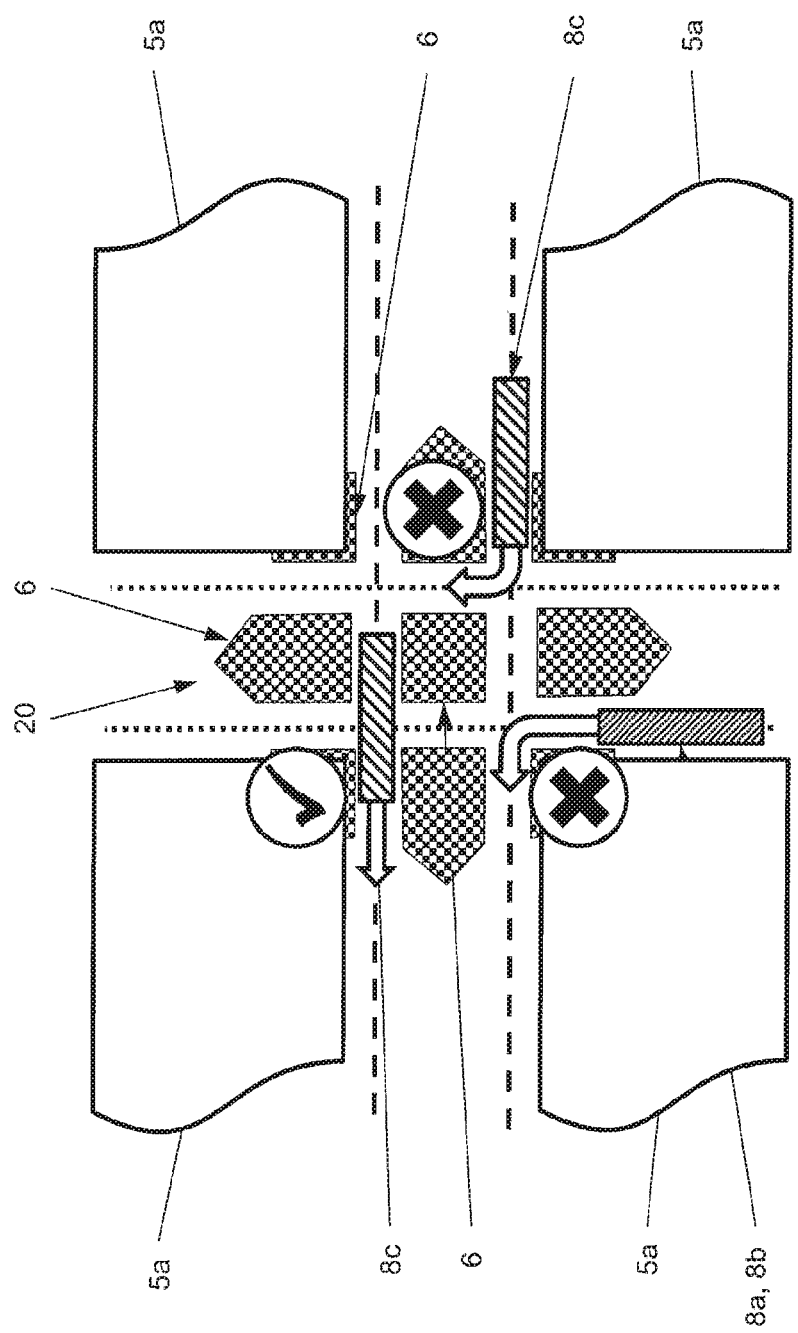

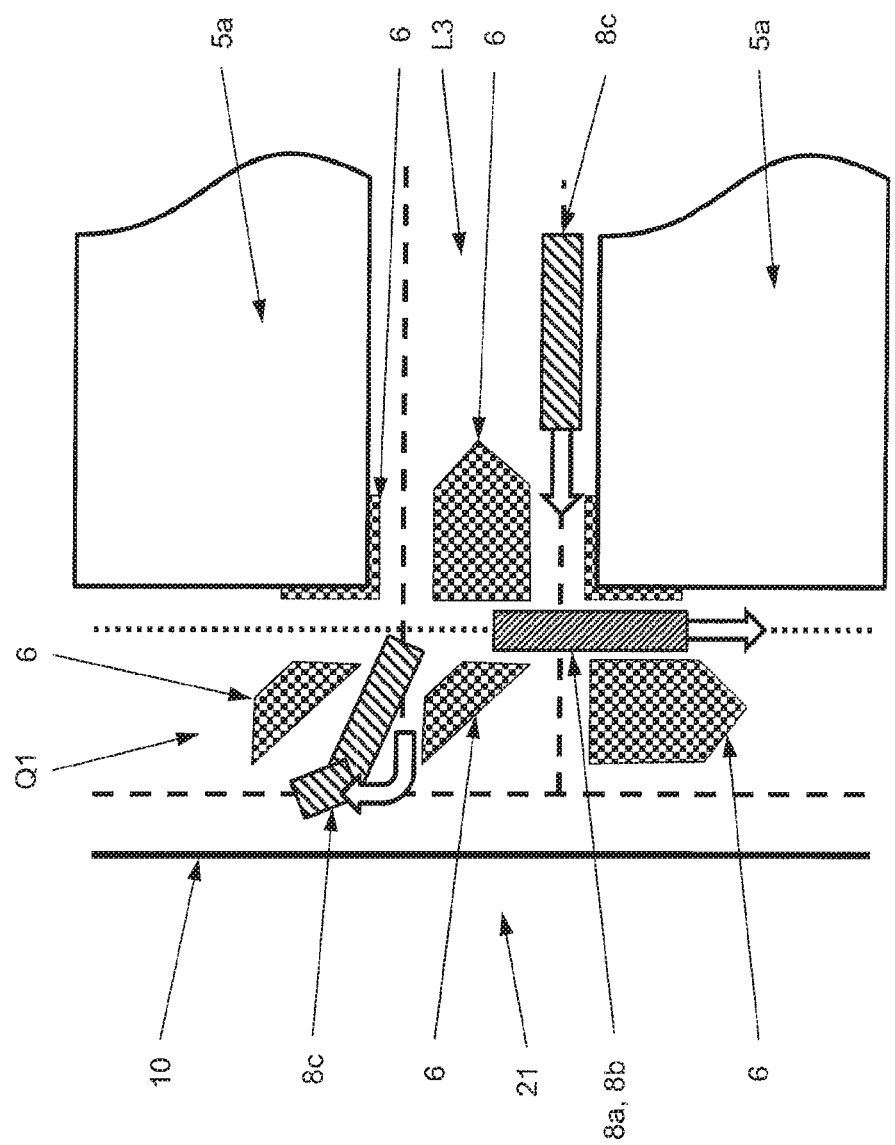

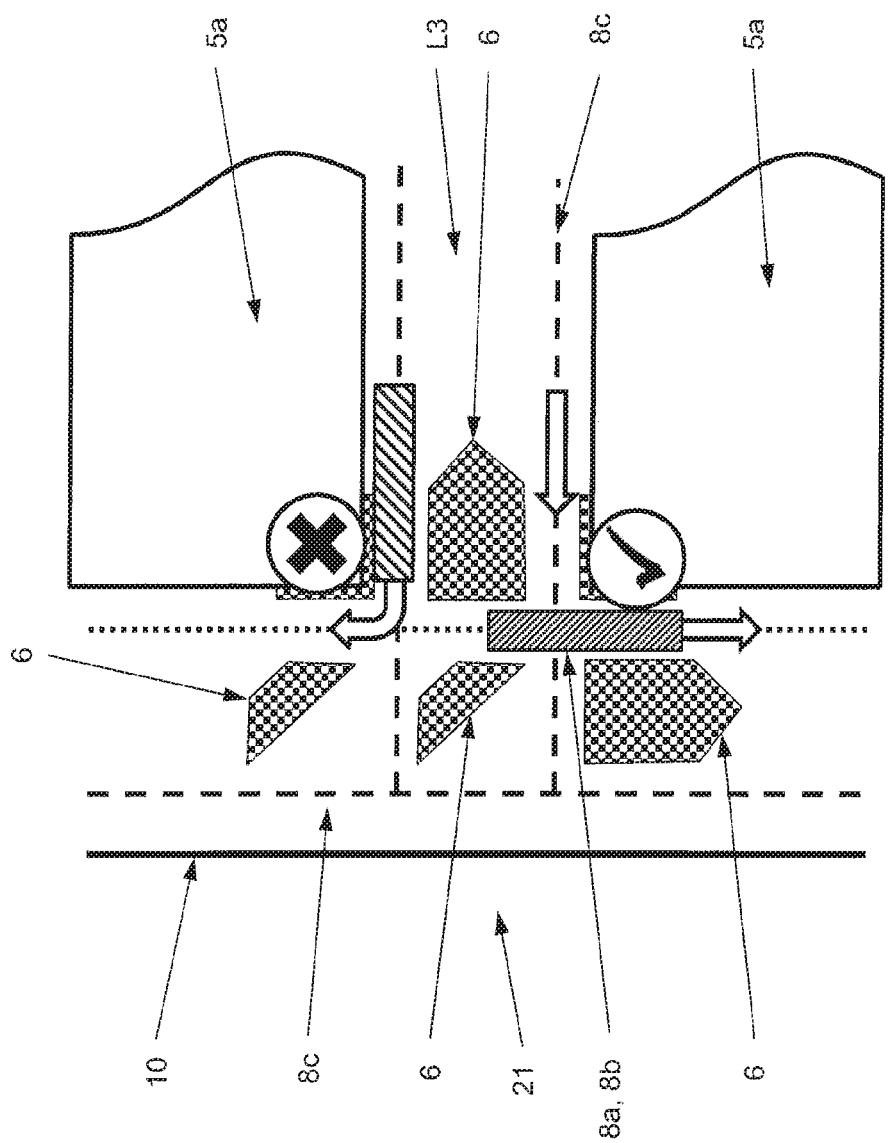

SYSTEM FOR TRANSPORTING CONTAINERS, PARTICULARLY ISO CONTAINERS, USING HEAVY GOODS VEHICLES

CROSS REFERENCE TO RELATED APPLICATION

The present application claims the priority benefits of International Patent Application No. PCT/EP2017/065171, filed Jun. 21, 2017, and claims benefit of German patent application DE 10 2016 111 450.2, filed on Jun. 22, 2016.

BACKGROUND OF THE INVENTION

In the context of the present invention, heavy-duty vehicles are industrial trucks that are designed for the handling and/or transport of corresponding containers in special terminals, in particular port terminals. Such containers may, in particular in the case of ISO containers in the loaded state, weigh up to 40 t and have normalized or at least standardized lengths of for example 10, 20, 40, 45, 53 or 60 feet (the last two lengths have so far been used exclusively in North America as containers that do not conform to ISO standards). In this connection, ISO containers are understood as meaning standardized large-capacity or sea-freight containers that are used in the international transportation of goods. In the terminals, corresponding containers are transferred between at least two means of transport of the same type or of different types, for example between ships, road vehicles and/or rail vehicles. Therefore, a correspondingly combined mix of transport may also take place, between water, road and/or rail. In this connection, containers may also be other normalized or at least standardized load units, such as for example interchangeable bodies, in particular interchangeable containers or swap bodies.

Such heavy-duty vehicles consequently include in particular special-purpose vehicles that are only operated within such terminals as internal heavy-duty vehicles and are generally not licensed for use on public traffic. These heavy-duty vehicles are therefore to be operated strictly separately from public traffic. Used for example as one possible vehicle type of such heavy-duty vehicles are special container transport vehicles, which have a loading area delimited by guiding elements kept at a distance from one another. The guiding elements are also referred to as directors and guide a container to be received, or its corner castings, onto the loading area. For this, the guiding elements extend with their guiding surfaces obliquely outward and upward away from the loading area. The loading area may also be designed here as part of a raisable and lowerable lifting platform. Such container transport vehicles are known for example from EP 2 637 954 B1. Also a motor tractor, referred to as a terminal truck or terminal tractor, may form a vehicle type of heavy-duty vehicles in the context of the present invention by itself or together with one or more trailers as a kind of semitrailer unit. Their loading area for receiving the load units is then respectively provided on the trailer or trailers. Such heavy-duty vehicles are known for example from DE 10 2012 108 768 A1. Also straddle carrier devices represent a vehicle type of heavy-duty vehicles in the context of the present invention. These heavy-duty vehicles are described for example in EP 2 694 424 B1. Such straddle carrier devices, which are also known as straddle carriers, van carriers, shuttle carriers or runners, are not only used as a heavy-duty vehicle for container transport in horizontal traffic, but in particular also as special handling devices for ISO containers. With the aid of a lifting device and a load receiving means referred to as a spreader, straddle carrier devices can raise containers and, after transporting them, set them down at a target location. Since the straddle carrier devices have a construction similar to the legs of a spider, they can move over a container resting on the ground or on another container and, depending on the type of design, as they do so also transport a raised container. Depending on the overall height, the straddle carrier devices are referred to for example as 1-over-3 devices, 1-over-2 devices, etc. A 1-over-3 device can set down a container onto 3 stacked containers, receive the uppermost of 4 stacked containers or move with a container it has received over 3 stacked containers.

The aforementioned heavy-duty vehicles can be manually guided and accordingly actively controlled, in particular during acceleration, braking and steering, by usually accompanying drivers. For this, manually guided heavy-duty vehicles have a corresponding vehicle control system and usually also a driver's cab, from which manual intervention in the vehicle control system can take place for manual guidance. Alternatively, the heavy-duty vehicles can also be automatically guided and accordingly controlled in an automated manner, in particular during acceleration, braking and steering, in the manner of so-called Automated Guided Vehicles (AGVs). For this, automatically guided heavy-duty vehicles have a suitable vehicle control system, so that no active manual intervention by an accompanying driver is required or possible on account of the automatic control or navigation thereby taking place. In this context, an automatically guided heavy-duty vehicle may also be manned, if there is an accompanying driver, who does not however have to actively intervene in the control of the heavy-duty vehicle in the manner of a vehicle driver, or cannot. Driverless heavy-duty vehicles which however are manually remote-controlled by a vehicle driver are not considered to be automatically guided vehicles, but manually guided vehicles.

Likewise known are conventional trucks, in particular semitrailer units, which are licensed and used for transporting corresponding normalized load units on public traffic. Such vehicles, also referred to as road trucks, likewise represent a vehicle type of manually guided heavy-duty vehicles in the context of the present invention. These heavy-duty vehicles are referred to hereinafter as external manually guided heavy-duty vehicles, since they can also be used on public traffic outside corresponding terminals.

Systems of the type concerned in the present case may also be part of a container terminal, for example a port terminal. Such a system is integrated here in the handling of containers, that is to say the corresponding loading and unloading of heavy-duty vehicles, ships and/or rail vehicles. In this connection, the aforementioned heavy-duty vehicles transport the containers for example on the water side of a container store between the container store and a container bridge for unloading or loading a docked ship with load units.

Also known in this context from European patent specification EP 2 637 954 B1 with respect to a container terminal is a system for handling containers that has as a separate operating area an automatic area and, separated from the latter by a fence, a manual area. In the automatic area, arranged on the water side with respect to a container store, only internal automatically guided container transport vehicles may be operated, and neither internal nor external manually guided container transport vehicles. The automatic area is guarded by a fence to prevent unauthorized persons from gaining access and to prevent manually guided heavy-duty vehicles from entering.

It is also known to operate internal and external manually guided heavy-duty vehicles in a container terminal in mixed mode traffic.

US 2006/0045659 A1 discloses a container terminal for handling containers between ships and external rail vehicles for railway transportation. In this case, containers are transported on the water side between ships and an intermediate store by internal heavy-duty vehicles. The land-side transport of containers to and from the intermediate store takes place by means of the external rail vehicles, for which corresponding rail tracks are routed into the container terminal and up to the intermediate store.

SUMMARY OF THE INVENTION

The present invention provides an improved system for transporting containers, in particular ISO containers, by means of heavy-duty vehicles that can be operated particularly safely and cost-effectively.

A system for transporting containers by means of heavy-duty vehicles which comprises at least one external heavy-duty vehicle and at least one internal heavy-duty vehicle, a container store with a storage area for containers and a handling device for them and also a separate operating area, in which the heavy-duty vehicles can be operated together in a mixed mode of transport, wherein at least one first lane for the at least one external heavy-duty vehicle and at least one second lane for the at least one internal heavy-duty vehicle are reserved in the separate operating area and the first and second lanes respectively lead through a transfer area of the handling device of the storage area, and the first and second lanes are respectively arranged here laterally of the storage area and in each case only in one of two storage aisles oppositely adjoining the storage area, so that the storage aisles are reserved in an alternating sequence only for the external heavy-duty vehicle or the internal heavy-duty vehicle, wherein the first and second lanes crossing in a crossing area of two storage aisles, is improved by providing that the lanes are physically separated from one another, at least in certain sections, by means of road markings and/or guiding elements serving as chicane-like barriers, wherein in the crossing area the road markings and/or the guiding elements are arranged such that the crossing area is designed as a pure crossover crossing or the crossing area is designed as a turn crossing, in order to ensure that the different traffic modes can only travel over the routes respectively designated for them.

In order that the heavy-duty vehicles can be operated together and in particular simultaneously in mixed mode traffic in the separate operating area, the separate operating area has a floor that can be driven onto by the heavy-duty vehicles together and at least in some sections does not have barriers. At least the sections that do not have barriers can in principle be reached and driven onto both by internal heavy-duty vehicles and by external heavy-duty vehicles. Any lanes there do not have barriers, that is to say are arranged next to one another and/or crossing one another but are not physically or spatially separated from one another by any barriers. This applies in particular outside the respective storage area and to transverse aisles adjoining the storage area there. At least in the crossing areas, the separate operating area can consequently be driven onto both by internal heavy-duty vehicles and by external heavy-duty vehicles in a coordinated manner and in particular one after the other in the course of mixed mode traffic.

According to the invention, the first and second lanes are arranged here in each case in one of two storage aisles oppositely adjoining the storage area. As a result, the first and second lanes are physically separated from one another within the separate operating area by the respective storage area. This facilitates the coordination of the mixed mode traffic and, as described in more detail below, reduces the points of contact between the different modes of transport. Of course, a number of lanes may also be provided for the respective heavy-duty vehicles within a storage aisle, so that the corresponding heavy-duty vehicles can overtake one another. Adjacent lanes may in this case be physically separated from one another, at least in certain sections, in the respective aisle and in its crossing areas, in particular by means of road markings and/or guiding elements serving as chicane-like barriers of the type described below.

Furthermore, the internal heavy-duty vehicle is preferably an automatically guided heavy-duty vehicle and the external heavy-duty vehicle is preferably a manually guided heavy-duty vehicle, so that mixed mode traffic comprising fully automated internally operating heavy-duty vehicles and manually guided external heavy-duty vehicles is possible. It is consequently therefore no longer required in particular for there to be a strict separation, and an uninterrupted spatial separation in particular by means of corresponding barriers, of automatically guided and manually guided heavy-duty vehicles, so that, unlike in the aforementioned prior art, it is no longer the case that exclusively automatically guided heavy-duty vehicles may be operated in the separate operating area. Instead, the automatically guided and manually guided heavy-duty vehicles can now be operated together in mixed mode traffic in the separate operating area. Furthermore, the system according to the invention also makes safe internal automated transport possible in areas in which there is mixed mode traffic by internal manually or automatically guided heavy-duty vehicles and external manually guided heavy-duty vehicles, such as for example conventional trucks. In particular, mixed mode traffic or mixed transport by internal automatically guided heavy-duty vehicles with external manually guided heavy-duty vehicles was not possible until now on account of the strict separation of automatically guided heavy-duty vehicles from manually guided heavy-duty vehicles. In an advantageous way, the degree of automation of so-called horizontal traffic by corresponding heavy-duty vehicles can consequently be successively increased, which on account of reduced personnel costs leads to increased cost-effectiveness.

Safe coordination of the mixed mode traffic is made possible by providing that the first and second lanes cross in a crossing area of two storage aisles, in which, according to the invention, the road markings and/or guiding elements are arranged such that the crossing area is designed as a crossover crossing or the crossing area is designed as a turn crossing. This ensures that the different traffic modes can only travel over the routes respectively designated for them.

It may also be advantageously provided here as a traffic rule that the external heavy-duty vehicle drives around clockwise in the operating area and the internal heavy-duty vehicle drives around counterclockwise in the operating area, or vice versa. This traffic rule applies correspondingly to all other external or internal heavy-duty vehicles in a corresponding way. Alternatively, it may also be provided that all of the external and internal heavy-duty vehicles must travel together in the same direction, that is to say clockwise or counterclockwise. By correspondingly specified directions of travel on the principle of a one-way street and the circulatory operation described in more detail below, the productivity and safety are increased, since tailbacks can be avoided or at least minimized. By its component parts described within the scope of this application, the system according to the invention makes possible a advantageous reduction and minimization of safety components, such as for example fences, traffic lights and access controls. These safety components were required until now to prevent the mixed mode traffic otherwise possible.

In an advantageous way, it is provided that the system comprises a fleet management system, by means of which the mixed mode traffic by the heavy-duty vehicles in the separate operating area can be coordinated, in particular by continuous processing of the positions of the heavy-duty vehicles, specification of routes for the heavy-duty vehicles, blocking of areas for the heavy-duty vehicles, etc.

In an advantageous way, it is provided that, within the separate operating area, a manually guided heavy-duty vehicle is provided with a driver information system and the driver information system is connected to the fleet management system, in order to give a driver of the heavy-duty vehicle instructions for the manual guidance of the heavy-duty vehicle.

In a constructionally simple way, it is provided that the driver information system is designed as a mobile device, which is arranged at the manually guided heavy-duty vehicle before it enters the operating area, preferably is given to the driver, and is carried along by the heavy-duty vehicle within the operating area.

Alternatively, in an advantageous way, it may be provided that the driver information system is permanently installed at the manually guided heavy-duty vehicle. This is advantageous in particular in the case of exclusively internally used heavy-duty vehicles that do not leave the separate operating area. Loss of the driver information system can thus be reliably avoided.

Reliable and safe operation is also achieved in an advantageous way by providing that an automatically guided heavy-duty vehicle, in particular its vehicle control system, is provided with a device for automatic navigation and/or with a device for position determination and/or with a sensor for object detection.

In an advantageous way, it is also provided that a wireless communication connection is provided between the heavy-duty vehicles and the fleet management system. The wireless communication connection may for example be designed as a W-LAN connection or LTE connection. Other wireless communication connections are of course also conceivable. These can be used in an easy way for exchanging operational information, such as transport orders, routes and alterations to them, the position and orientation of the heavy-duty vehicles within the operating area, instructions for the drivers, prohibited areas and further operational information mentioned in the description below.

In an advantageous way, it may be provided that the separate operating area is part of a container terminal, Ro-Ro terminal, logistics center or industrial plant. It may be advantageously provided here that a handling device for the normalized or operationally internally standardized or cross-operationally standardized load units, in particular in the form of a container bridge, a harbor crane or a stacking crane of a container store, is additionally arranged in the separate operating area and both the automatically guided heavy-duty vehicles and the manually guided heavy-duty vehicles can be operated to drive back and forth to the handling device for receiving or surrendering a load unit.

An exemplary embodiment of the invention is explained in more detail on the basis of the following description.

BRIEF DESCRIPTION OF THE DRAWINGS

FIGS. 5a to 5c show views of a first crossing area of storage aisles; and

FIGS. 6a and 6b show views of a second crossing area of storage aisles.

DESCRIPTION OF THE PREFERRED EMBODIMENTS

Figure 1:
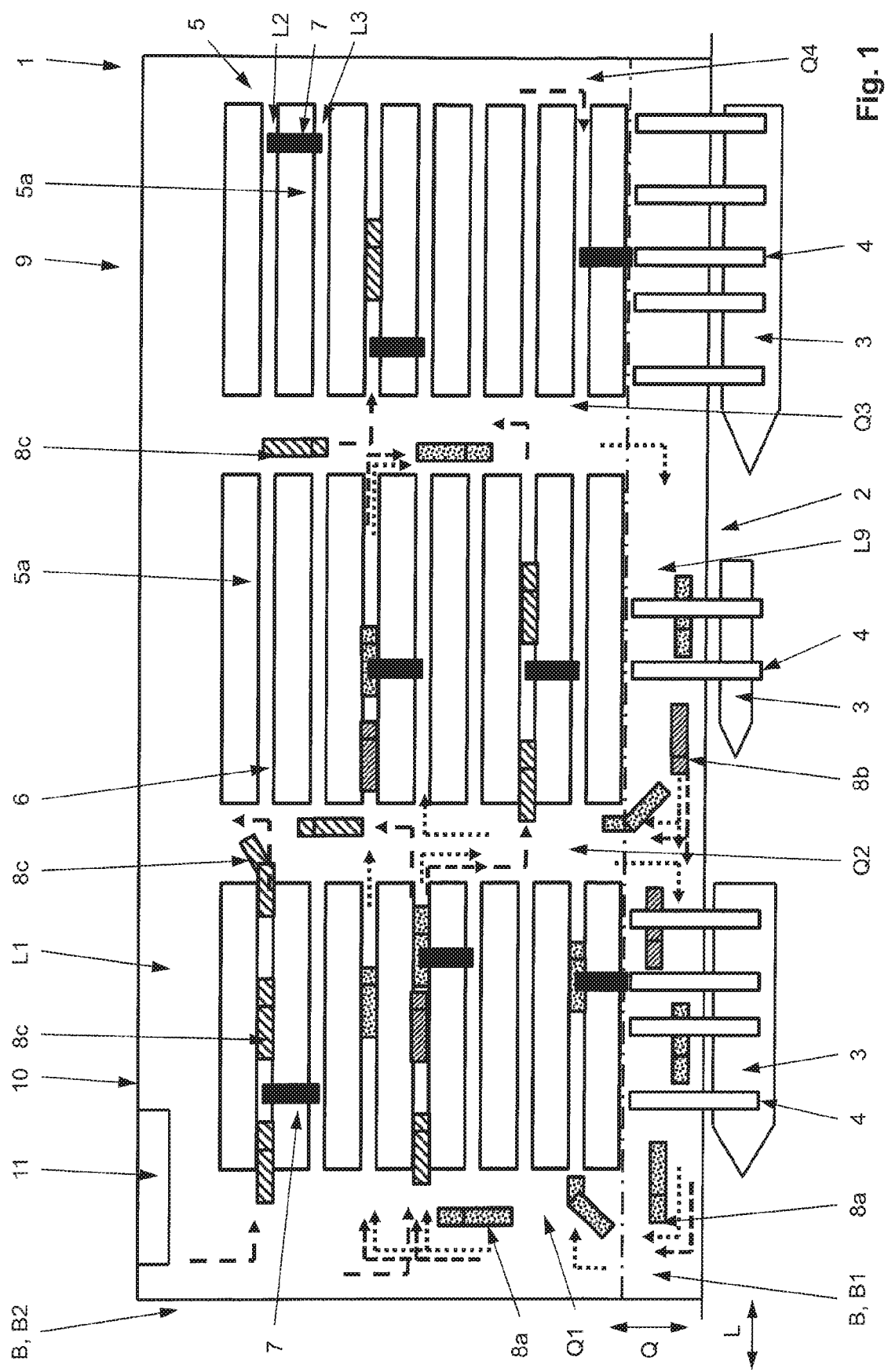
FIG. 1 shows a schematic view of a container terminal in plan view.

In FIG. 1, a schematic view of a container terminal 1, which is designed as a port terminal, is shown in plan view. Here, a number of ships 3 can dock at a quay 2 of a harbor, in order to deliver or pick up containers. Provided on the quay 2 for loading or unloading the ships 3 are container bridges 4, which are also referred to as ship-to-shore cranes and the booms of which extend on the one hand over the ships 3 and on the other hand over the quay 2. Alternatively, the loading and unloading of the ships 3 may also take place by means of so-called harbor cranes, the booms of which are thereby swiveled over the corresponding ship 3 about a vertical axis. Both the container bridges 4 and the harbor cranes represent so-called handling devices.

The container terminal 1 is surrounded by a delimitation and in this way is separated from its external surroundings and from the public traffic outside the container terminal 1. Moreover, the container terminal comprises within the delimitation 10 a container store 5, in which containers for short-term intermediate storage can be stacked in at least one storage area 5a, also referred to as a stack, after they have been unloaded from the ships 3 and before they are loaded onto a road or rail vehicle for further transport or after they have been delivered by the latter and before they are loaded onto the ships 3. Preferably a number of storage areas 5a and a number of storage aisles are provided here, in order to keep the at least one storage area 5a at a distance from the delimitation 10, or in the case of a number of storage areas 5a to keep two adjacent storage areas 5a respectively at a distance from one another and at a distance from the delimitation 10 of the container terminal. This results in a regular grid-like arrangement of the storage areas 5a. The storage aisles substantially comprise longitudinal aisles L1 to Ln running in the longitudinal direction L parallel to the edge of the quay 2, in FIG. 1 nine longitudinal aisles L1 to L9, and transverse aisles Q1 to Qn running perpendicularly to the quay 2 in the transverse direction Q, in FIG. 1 four transverse aisles Q1 to Q4. The transverse aisles Q1 to Qn consequently cross the longitudinal aisles L1 to Ln at right angles, but other angles between the storage aisles are also possible. In the storage areas 5a, the containers are aligned with their longitudinal side parallel to the longitudinal direction L. On each of the four sides of each storage area 5a, there adjoins a storage aisle in the form of two opposite longitudinal aisles and two opposite transverse aisles. Here, in each storage area 5a a number of rows of containers, for example ten, may be set down with their longitudinal sides next to one another and in each row six containers or even more containers can be set down one on top of the other. For managing the container store 5, that is to say for storing and retrieving the containers in the container store 5, at least one stacking crane 7 is provided for all of the adjacent storage areas 5a in the longitudinal direction L. Each stacking crane 7 is preferably designed as a gantry crane, which has one or two crane girders 7a kept parallel and at a distance from one another. The crane girders 7a extend in the transverse direction Q, span each row of the associated storage area 5a and in the transverse direction Q project on both sides beyond the associated storage area 5a above the adjoining longitudinal aisles, whereby in plan view they cover part of the respective longitudinal aisle and the lanes there (see FIG. 3). The crane girder or girders 7a are carried by four vertical supports 7b (see FIG. 4) and together form the gantry-like construction. For the storage and retrieval of containers, the stacking crane 7 may be moved in the longitudinal direction L along the associated storage area 5a over the containers stacked therein, and consequently along the associated longitudinal aisles. In the transverse direction Q, a load receiving means suspended from the crane girder 7a, usually a spreader frame, can be moved past the supports 7b, and through between them. This allows containers to be picked up or unloaded by the stacking crane 7 in both of the longitudinal aisles respectively adjoining the storage area 5a and lying opposite one another. Such stacking cranes 7 likewise represent handling devices and may for example be designed as so-called automated stacking cranes (ASCs for short), rubber-tired stacking cranes (rubber-tired gantry cranes or RTGs for short) or rail-bound stacking cranes (rail-mounted gantry cranes or RMGs for short). This allows a stacking crane 7 also to manage a number of adjacent storage areas 5a in the longitudinal direction L, which, seen in the longitudinal direction L, are arranged one behind the other and are respectively kept at a distance from one another by a transverse aisle, and for this travel over one or more transverse aisles. Alternatively, each storage area 5a may be assigned a stacking crane 7. Unlike in the case of the layout of the container terminal 1 represented in the present case, also conceivable is a layout turned by degrees with respect to the quay 2, in which in particular the storage areas 5a and the longitudinal aisles accordingly do not extend substantially parallel, but transversely and substantially perpendicularly to the edge of the quay 2. This applies in particular to when the stacking cranes 7 are designed as ASCs.

In a separate operating area B within the container terminal 1, at least one internal automatically guided heavy-duty vehicle 8a and/or at least one internal manually guided heavy-duty vehicle 8b and/or at least one external manually guided heavy-duty vehicle 8c are operated together and simultaneously for transporting containers. As described more specifically below, safe mixed mode traffic by automatically guided and manually guided heavy-duty vehicles and/or mixed mode traffic by internal and external heavy-duty vehicles 8a, 8b, 8c is therefore possible in the separate operating area B. By means of the internal automatically or manually guided heavy-duty vehicles 8a, 8b, transport of the containers between the container store 5 or its handling devices and the handling devices arranged on the quay 2 takes place. By means of the external manually guided heavy-duty vehicles 8c, containers can be picked up from the container store 5 or its stacking crane 7 for further transport on public traffic or be delivered for intermediate storage in the container store 5 after being transported on public traffic. These transporting operations respectively take place in so-called horizontal traffic.

Both the handling devices arranged on the quay 2 and the handling devices arranged in the container store 5 or the storage areas 5a can transfer containers, and consequently load and unload the heavy-duty vehicles 8a, 8b, 8c when they are in corresponding transfer areas underneath the booms or crane girders 7a of the respective handling device. The containers may be transferred here directly between the respective heavy-duty vehicle 8a, 8b, 8c and the container bridge 4 or the heavy-duty vehicle 8a, 8b, 8c and the stacking crane 7 of the container store 5. If the transport of the containers takes place by horizontal traffic with straddle carrier devices or heavy-duty vehicles 8a, 8b with a lifting platform, the containers can first be set down in the transfer area on the ground or a container already set down there or transfer racks or be received from them. The transfer areas consequently represent in each case an interface between the horizontal traffic and a handling device.

The internal heavy-duty vehicles 8a, 8b may for example be designed as container transport vehicles, terminal trucks or straddle carrier devices as defined above. In principle, the entire fleet of heavy-duty vehicles 8a, 8b in the container terminal 1 may comprise only one of the aforementioned vehicle types, that is to say for example only terminal trucks, or else a number of different vehicle types, that is to say for example terminal trucks and straddle carrier devices. These vehicle types are only intended and designed or licensed for internal operational use, that is to say for internal operation within the container terminal 1 or in its separate operating area B, and not for external use on public traffic. Such heavy-duty vehicles 8a, 8b can be moved by means of wheels freely on the quay 2, and consequently in a floor-bound, but not rail-bound manner. Accordingly, the heavy-duty vehicles 8a, 8b are distinguishable from rail vehicles, and in particular from railroad cars. The wheels of the heavy-duty vehicles 8a, 8b are respectively provided with tires, which are preferably air-filled rubber tires in the manner of pneumatic tires. The heavy-duty vehicles 8a, 8b also respectively comprise a travel drive comprising a motor, for example designed as an electric motor or an internal combustion engine, and a transmission, in order by this means to drive the wheels.

The external heavy-duty vehicles 8c are usually designed as defined above as conventional trucks that are licensed for public traffic.

The separate operating area B is arranged within the delimitation 10 and as a result is likewise separated from the public traffic outside the container terminal 1. The delimitation 10 may extend up to the edge of the quay 2 and be designed for example as a fence or wall. The delimitation 10 is interrupted at one or more points, in order to form there one or more external passing areas 11 for the external manually guided heavy-duty vehicles 8c. Coming from the public traffic outside the container terminal 1, the heavy-duty vehicles 8c can only drive into the container terminal 1 through the passing areas 11, and already thereby (see FIG. 1) or only subsequently (see FIG. 3) drive through a further external passing area 11a into the operating area B, and drive back from there out of the operating area B and to the public traffic. For the specifically intended opening and closing of each passing area 11, 11a, a safety lock for checking the entering and leaving heavy-duty vehicles 8c and their drivers in and out, including identification, may also be respectively provided. The internal heavy-duty vehicles 8a, 8b must not drive through the passing areas 11, 11a, since they must not go onto the public traffic outside the container terminal 1 and also must not leave the operating area B. The automatically guided heavy-duty vehicles 8*a* may in any case only be operated as intended within the operating area B. An exception to this is leaving the operating area B for example for purposes of maintenance or repair.

In this case, however, the heavy-duty vehicles 8*a* do not leave the operating area B in an automatically guided manner, so that this is not considered to be operation as intended. Unlike in the aforementioned prior art, in addition to the internal automatically guided heavy-duty vehicles 8*a*, the internal and/or external manually guided heavy-duty vehicles 8*b*, 8*c* can also be operated together or simultaneously with them in the separate operating area B.

Figure 2:
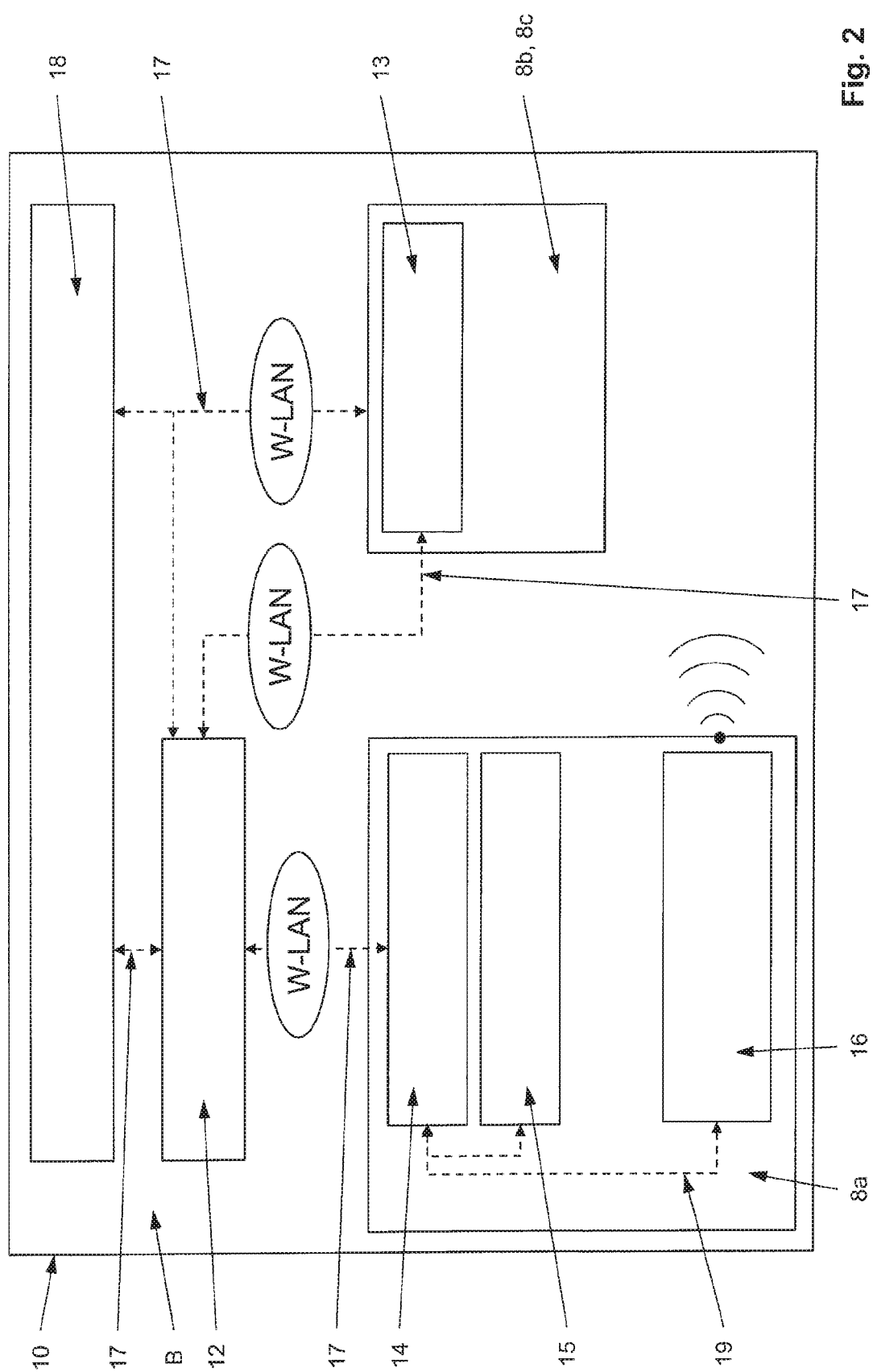
FIG. 2 shows a schematic functional representation of a system for realizing mixed mode traffic comprising manually and automatically guided heavy-duty vehicles in a separate operating area.

FIG. 2 shows a schematic functional representation of a system for realizing mixed mode traffic comprising manually and automatically guided heavy-duty vehicles 8*a*, 8*b*, 8*c* in the separate operating area B. The separate operating area B of the container terminal 1 can be seen.

A fleet management system 12, by means of which the simultaneously taking place transportation by the internal and external or automatically and manually guided heavy-duty vehicles 8*a*, 8*b*, 8*c* in the separate operating area B and in particular in the storage aisles is coordinated, is provided as a modular functional component of the system for the mixed mode traffic. In the course of this, the exchange of various operational information described below takes place, and in particular route planning and route monitoring are thereby carried out. For this purpose, wireless communication connections 17 in the manner of data connections, for example in the form of W-LAN connections, can be established between the heavy-duty vehicles 8*a*, 8*b*, 8*c* and the fleet management system 12 for the exchange of the operational information. For the route planning and route monitoring, in particular continuous processing of the time-variable positions of all of the heavy-duty vehicles 8*a*, 8*b*, 8*c* located in the operating area B takes place by the fleet management system 12. The fleet management system 12 therefore knows important operational information about the status, in particular the position of each heavy-duty vehicle 8*a*, 8*b*, 8*c* in the corresponding storage aisle or the respectively used traveling areas, lanes and directions of travel. It is also possible here by means of the fleet management system 12 and the communication connections to specify and alter routes for the heavy-duty vehicles 8*a*, 8*b*, 8*c*, for example by target positions of storage aisles, lanes and/or directions of travel to be used that are specified for certain points in time.

Moreover, the fleet management system 12 may dynamically block areas in the manner of prohibited areas or release areas, in particular individual storage aisles or lanes, for all of the heavy-duty vehicles 8*a*, 8*b*, 8*c* located in the operating area B, and consequently ensure that in a specified area there is only one heavy-duty vehicle 8*a*, 8*b*, 8*c*. Furthermore, the fleet management system 12 may manage or coordinate the entering and leaving of the heavy-duty vehicles 8*a*, 8*b*, 8*c* to the aforementioned transfer areas and also maintenance orders and, in the case of battery-operated heavy-duty vehicles 8*a*, 8*b*, also possibly required battery changing orders or battery charging orders. The fleet management system 12 may also carry out so-called deadlock monitoring of the automatically guided heavy-duty vehicles 8*a*.

Within the separate operating area B, the manually guided heavy-duty vehicles 8*b*, 8*c* are provided with a further modular functional component in the form of a driver information system 13, which is also referred to as an on-board unit. It may be provided that manually guided heavy-duty vehicles 8*b*, 8*c* may only enter the separate operating area B together with such a driver information system 13. Only then can each manual heavy-duty vehicle 8*b*, 8*c* be integrated and taken into account in the coordination of the mixed mode traffic. This increases the productivity and also the safety of the container terminal 1, since tailbacks can be avoided or at least minimized. The driver information system 13 communicates here for the exchange of operational information with the fleet management system 12 respectively by means of one of the wireless communication connections 17. In the course of this, the fleet management system 12 transmits operational information, in particular in the form of instructions for the manual guidance of the heavy-duty vehicle 8*b*, 8*c*, to the driver of the respective heavy-duty vehicle 8*b*, 8*c* by means of the driver information system 13. Instructions may include the specifications already explained above of a route to the target point and alterations to it, preferably including storage aisles, lanes, directions of travel to be used, currently set-up prohibited areas, traveling speeds and traffic rules. The driver information system 13 also determines possible deviations from the instructions and informs or warns the driver of these optically and/or acoustically. In this connection, the driver information system 13 preferably determines continuously, and for example by means of a GPS unit, the position of the heavy-duty vehicle 8*b*, 8*c* and also reports this back to the fleet management system 12. Information about the operational situation in the operating area B may also be provided by means of the driver information system 13.

The driver information system 13 may be designed as a mobile device, which is preferably arranged on each manually guided heavy-duty vehicle 8*b*, 8*c* at the latest before it enters the operating area B and is carried along by the heavy-duty vehicle 8*b*, 8*c* within the operating area B. For this, the driver information system 13 may be given to the driver on entering the container terminal 1 in the passing area 11 or 11*a* and be surrendered again on leaving. Corresponding mobile devices are used in particular for external manually guided heavy-duty vehicles 8*c* such as conventional trucks. In the case of heavy-duty vehicles 8*b* that are used purely for internal operations, the driver information system 13 may also be designed as a mobile device or be permanently installed on the heavy-duty vehicle 8*b*.

The automatically guided heavy-duty vehicles 8*a*, in particular their vehicle control systems, are respectively provided with a further modular functional component in the form of a device for automatic navigation 14 within the operating area B. The heavy-duty vehicles 8*a* can thereby navigate and be automatically controlled in a computer-aided manner on the basis of the routes specified by the fleet system 12. To be able to continuously determine the position and orientation within the operating area B and transmit them as operational information to the fleet management system 12 by means of the corresponding communication connection 17, each automatically guided heavy-duty vehicle 8*a* is provided with a further modular functional component in the form of a device for position determination 15. Transponder technology is preferably used for this. Accordingly, the devices for position determination 15 have at least one antenna, by means of which transponders let into the floor of the operating area B at predetermined points can be detected and in this way the position and orientation of the heavy-duty vehicle 8*a* can be determined. Other methods for determining the position and orientation can of course also be used, for example D-GPS/LPR. The determined positions and orientations may also be transmitted in terms of control technology by means of a corresponding data line 19 to the device for automatic navigation 14, and consequently be taken into account in the form of a setpoint-actual comparison in the automatic guidance along the specified and possibly altered routes. Furthermore, in this context a sensory object detection may take place and be taken into account for monitoring the traveling route to increase safety. For this, the automatically guided heavy-duty vehicles 8a are respectively provided with a sensor for object detection 16 as a further modular functional component, which is operatively connected in terms of control technology by means of the data line 19 and the device for automatic navigation 14 or the device for position determination 15 to the vehicle control system. If an obstacle is detected on or at a predetermined distance alongside the lane, an intervention into the vehicle control system is made in order to prevent a collision. The heavy-duty vehicle 8a can thereby be automatically braked and/or automatically made to drive around the detected obstacle. The obstacle may also be another heavy-duty vehicle 8a, 8b, 8c, which is for example traveling ahead or approaching a crossing area in which there is the risk of a collision (see FIG. 5a). The fleet management system 12 coordinates the different traffic, however, such that generally internal and external or automatically and manually guided heavy-duty vehicles 8a, 8b, 8c cannot enter the crossing areas at the same time and meet one another. In particular as a result of the minimization of points of contact between the transporting operations described below, it is therefore only in exceptional cases that an intervention has to be made in the crossing areas by means of the object detection 16.

The fleet management system 12 may be integrated in a terminal management system 18, and consequently be part of it or be in connection with it for an exchange of operational information by means of a wireless or wire-bound communication connection 17, in order to be able to exchange operational information. By means of the terminal management system 18, transport orders for the heavy-duty vehicles 8a, 8b are planned and transmitted to the fleet management system 12 by means of the communication connection 17. The transport orders can then be managed by the fleet management system 12 and be used for the coordination of the mixed transport comprising automatically guided and manually guided heavy-duty vehicles 8a, 8b, in particular the route planning and route monitoring thereby taking place.

Routes are subsequently generated from the transport orders by the fleet management system 12 and transmitted by means of the wireless communication connections 17 to the heavy-duty vehicles 8a, 8b. Moreover, the terminal management system 18 may also transmit transport orders directly by means of a further wireless communication connection 17, for example in the form of a W-LAN connection, to the manually guided heavy-duty vehicles 8b or their driver information system 13. By means of the communication connection 17 to the fleet management system 12, a coordinated integration of the corresponding heavy-duty vehicles 8b in the mixed transport can then likewise take place on the basis of the transport orders, in that the fleet management system 12 transmits corresponding instructions for the manual guidance of the heavy-duty vehicle 8b to the driver of the respective heavy-duty vehicle 8b by means of the driver information system 13. The store keeping or management of the container store 5 may also take place by means of the terminal management system 18 and be taken into consideration in the planning of the transport orders.

Figure 3:
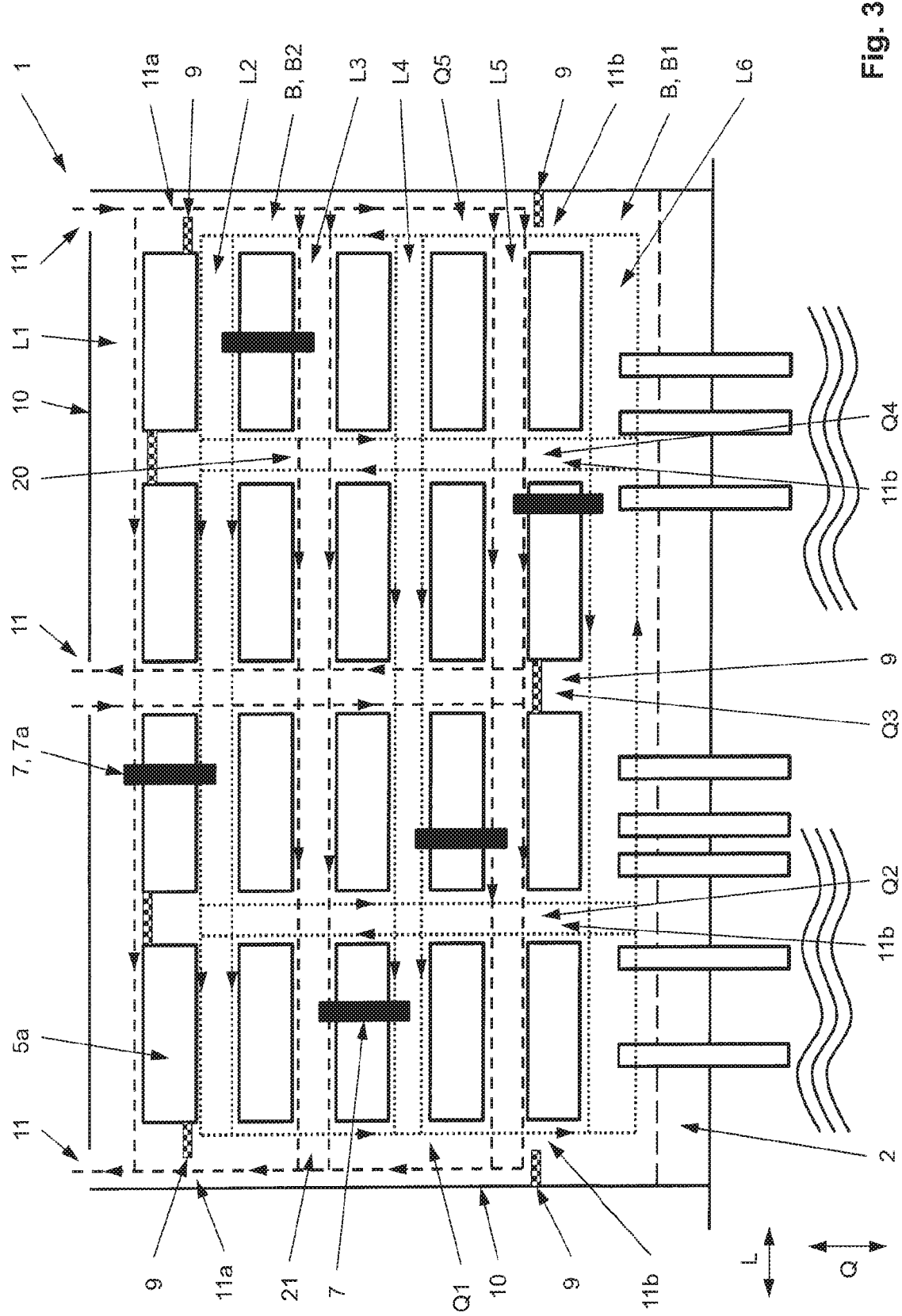
FIG. 3 shows a further schematic view of the container terminal in plan view.

FIG. 3 shows a further schematic view of the container terminal 1 in plan view. Six longitudinal aisles L1 to L6 and five transverse aisles Q1 to Q5, by means of which the storage areas 5a are kept apart from one another and also from the delimitation 10 and the handling devices arranged on the quay 2, are represented. Each storage aisle comprises at least one lane for the heavy-duty vehicles 8a, 8b, 8c. For better overall clarity, however, no heavy-duty vehicles 8a, 8b, 8c are represented in FIG. 3, but instead the lanes provided for them are schematically represented as lines provided with arrows. Lanes that are reserved for internal heavy-duty vehicles 8a, 8b are represented by dotted lines and lanes that are reserved for external heavy-duty vehicles 8c are represented by dashed lines. It can be seen that the storage aisles are reserved or kept only for certain of the heavy-duty vehicles 8a, 8b, 8c in an alternating sequence, and may only be driven onto by the correspondingly other heavy-duty vehicles 8a, 8b, 8c in some crossing areas 20, 21 of two storage aisles for crossing over. Only in the outer transverse aisles Q1 and Q5 are the lanes of corresponding heavy-duty vehicles 8a, 8b, 8c that are otherwise separated in the manner of aisles provided together and with opposite directions of travel.

Within the container terminal 1 and the delimitation 10, the separate operating area B may also be at least partially delimited by further boundary elements 9, which do not coincide with the delimitation 10 and further delimit the operating area B with respect to the outer delimitation 10. The further boundary elements 9 of the operating area B may also be designed as a fence or wall. In the present example, a boundary element 9 is respectively provided between the first two longitudinal aisles L1 and L2 and in the outer transverse aisles Q1, Q2, Q4 and Q5. The outermost boundary elements 9 in the transverse aisles Q1 and Q5 serve as a barrier for the lanes used by the heavy-duty vehicles 8a and prevent them from leaving the operating area, but in each case form a passing area 11a for the heavy-duty vehicles 8c. The inner two boundary elements 9 delimit the operating area B between the corresponding storage areas 5a in the transverse aisles Q2 and Q4. Also the storage areas 5a themselves delimit the operating area B between the first two longitudinal aisles L1 and L2. In the third transverse aisle Q3, designed between the longitudinal aisles L1 and L2 of the adjacent storage areas 5a is a further passing area 11a, through which heavy-duty vehicles 8c can enter and leave the operating area B. For this, corresponding lanes with opposite directions of travel are provided in the transverse aisle Q3.

Figure 4:
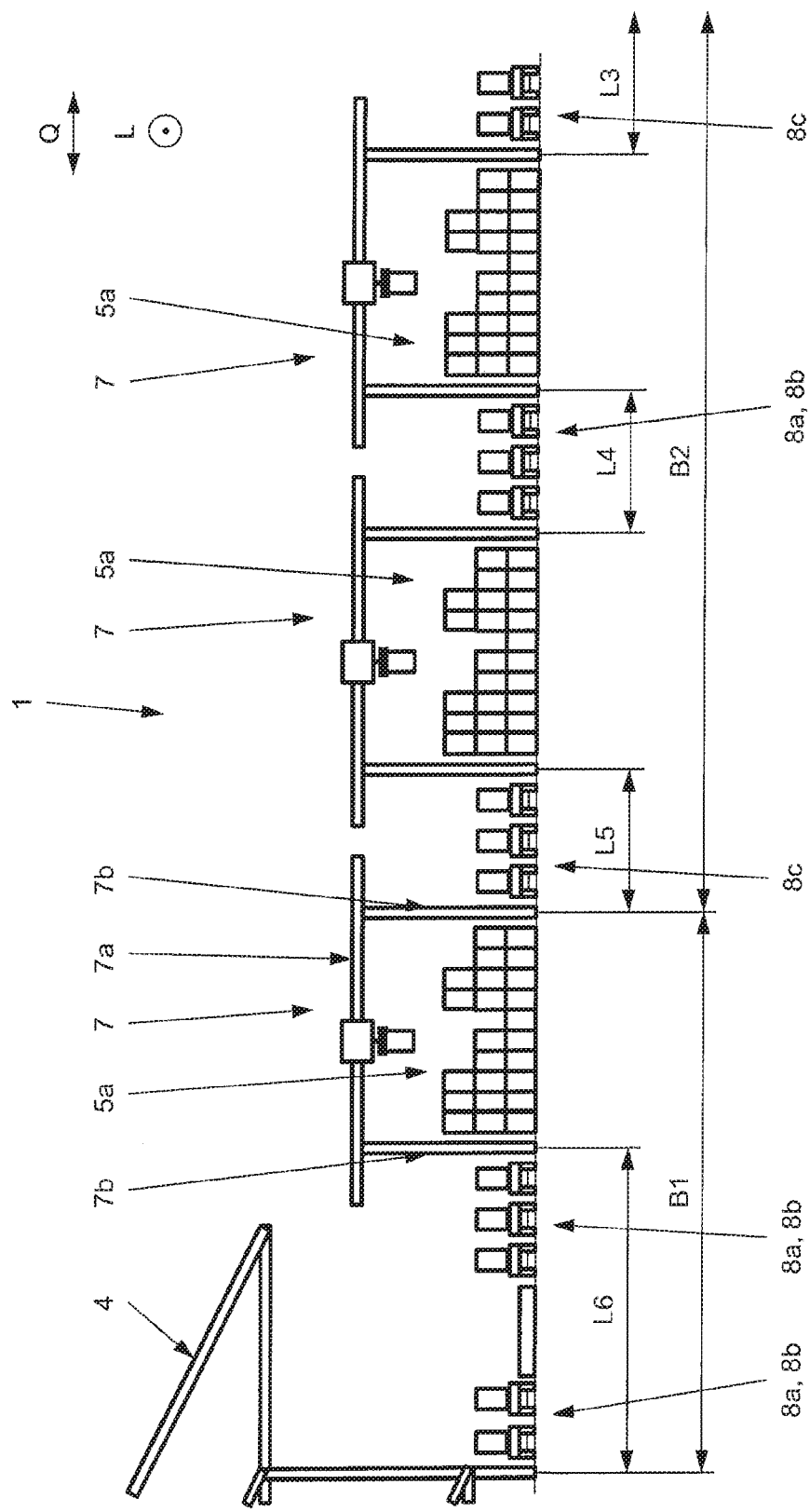
FIG. 4 shows a schematic view as a detail of the container terminal in a side view.

The separate operating area B may comprise a first area B1 in the manner of an internal area and a second area B2 adjoining thereto in the manner of a mixed area (also see FIGS. 1 and 4). In the internal first area B1, no mixed mode traffic, but exclusively internal transport is allowed. Accordingly, only internal heavy-duty vehicles 8a and/or 8b, such as for example the terminal trucks schematically represented in FIG. 1, may enter and leave the first area B1. External manually guided heavy-duty vehicles 8c, such as conventional trucks, are excluded from this internal area B1, but may drive around in the second area B2. For delimiting the first area B1 with respect to the second area B2, further boundary elements 9 may be provided by analogy with the aforementioned boundary elements 9 and respectively form an internal passing area 11b with or without a safety lock. By means of each passing area 11b, the first area B1 is connected to the second area B2, but only internal heavy-duty vehicles 8a, 8b are allowed to pass through. The boundary elements 9 respectively installed between the longitudinal aisles L5 and L6 in the transverse aisles Q1 and Q5 consequently serve as a barrier for the lanes used by the heavy-duty vehicles 8c. The inner boundary element 9 delimits the operating area B between the corresponding storage areas 5a in the transverse aisle Q3. In the transverse aisles Q2 and Q4, respectively designed between the longitudinal aisles L5 and L6 of the adjacent storage areas 5a is a further passing area 11b, through which only internal heavy-duty vehicles 8a, 8b, preferably only heavy-duty vehicles 8a, can enter and leave the operating area B. For this, respectively corresponding lanes with opposite directions of travel are provided in the transverse aisles Q2 and Q4.

As an alternative or in addition to corresponding boundary elements 9 or barriers, the entering of heavy-duty vehicles 8c and/or 8b into the first area B1 or the leaving of the operating area B by heavy-duty vehicles 8a and/or 8b may also be prevented by providing that the routes specified by means of the fleet management system 12 only run outside the first area B1, in particular only in the second area B2. For this, the internal first area B1 may be defined by the fleet management system 12 as a prohibited area and be taken into account as such in the route planning and route monitoring, and consequently be excluded for the heavy-duty vehicles 8c and/or 8b. The first area B1 may therefore also be operated as a purely automatic area, in which only heavy-duty vehicles 8a may drive around.

The internal first area B1 preferably extends on a side of the container store 5 that is on the water side and facing the quay 2 and comprises the container bridges 4 and also the storage areas 5a at least directly adjoining the quay 2 and also the longitudinal aisle L6. The second area B2, serving as the mixed area, comprises the other storage areas 5a of the container store 5, so that both internal heavy-duty vehicles 8a, 8b and external heavy-duty vehicles 8c may travel around in its storage aisles, while taking into account the specifications described in more detail below. Only the external heavy-duty vehicles 8c may leave the operating area B and the container terminal 1 through the passing areas 11, 11a.

By the already mentioned reservation or specification of lanes or storage aisles for transporting operations of certain heavy-duty vehicles 8a, 8b, 8c, at the same time for each storage area 5a and associated stacking crane 7 the two transfer areas of the stacking crane 7 are reserved for corresponding traffic. The lanes are therefore arranged laterally of the storage areas 5a and therefore adjoin the corresponding stacking crane 7, at least within the transfer areas. This allows the stacking cranes 7, designed for example as so-called double-cantilever RMGs, to transfer or receive containers on both sides, in particular longitudinal sides, of a storage area 5a in the storage aisles adjoining there, and consequently optionally to an internal, possibly automatically guided heavy-duty vehicle 8a, 8b or external heavy-duty vehicle 8c. This also becomes clear in FIG. 4, which shows a schematic view as a detail of the container terminal 1 in a side view. While, for the sake of better overall clarity, in FIG. 3 no more than two lanes for each storage aisle are represented by way of example, more lanes may also be provided in the longitudinal aisles. This is shown in FIG. 4 by way of example for the longitudinal aisles L5 and L4, which respectively have three lanes. Of these, the middle lane in each case represents a kind of bypass lane, which unlike the other lanes is not led through the transfer area of the stacking cranes 7 underneath the crane girders 7a. The bypass lane can therefore be used for overtaking heavy-duty vehicles 8a, 8b, 8c that are in the transfer area for loading or unloading. Apart from a lane led through the transfer area of the associated stacking crane 7, the longitudinal aisle 6 extending on the quay comprises in the present example altogether four further lanes, of which at least some lead through the transfer area of the container bridges 4.

The reservation represented by way of example in FIG. 3 provides that the storage aisles or the lanes running in them between the storage areas 5a are used as follows: longitudinal aisles L1, L3, L5 for external heavy-duty vehicles 8c, longitudinal aisles L2, L4, L6 for internal heavy-duty vehicles 8a, 8b, transverse aisles Q1 and Q5 together for heavy-duty vehicles 8a, 8b, 8c with opposite direction of travel for internal and external traffic, transverse aisles Q2 and Q4 for internal heavy-duty vehicles 8a, 8c, transverse aisle Q3 for external heavy-duty vehicles 8c. As can be seen in FIG. 3, mixed mode traffic by automatically guided and manually guided or internal and external heavy-duty vehicles 8a, 8b, 8c thus only occurs in the second area B2, and there in particular in the outer transverse aisles Q1 and Q5, and also in some, in the present case every second, crossing areas of transverse aisles and longitudinal aisles, but not within a longitudinal aisle between the crossing areas.

As represented by the orientation of the arrows of the corresponding lines for the lanes in FIG. 3, directions of travel are specified for the different transporting operations. In the present example, it is provided for the external heavy-duty vehicles 8c that they drive in a kind of circulatory operating mode around storage areas 5a and thereby in a clockwise sense, and accordingly enter and leave the operating area B in their lanes. The internal heavy-duty vehicles 8a, 8b drive around in the operating area B in a corresponding circulatory operating mode in a counterclockwise sense. All of the lanes running through the longitudinal aisles L1 to L5 have the same direction of travel in the manner of one-way streets. Only in the longitudinal aisle L6 is a circulatory operating mode with opposite directions of travel possible. Furthermore, the lanes to be driven over in the individual storage aisles are specified. For the inner transverse aisles Q2 to Q4, for example, driving on the left may be specified for the internal heavy-duty vehicles 8a, 8b and driving on the right may be specified for the external heavy-duty vehicles.

By the aforementioned specifications, which are also taken into account by the fleet management system 12 in the specification and alteration of routes described above, the points of contact between the different traffic modes (internal/external or automatic/manual) are reduced to a minimum. Points of contact do arise, however, in crossing areas between the transporting operations in which the respective transporting operations take specified defined routes. In order that precisely these routes are taken, corresponding road markings may be provided in the crossing areas. As an alternative or in addition, the lanes are however provided with guiding elements 6 in the form of chicane-like fixtures, so that only the intended routes are possible (not represented in FIG. 3 for the sake of better overall clarity).

By way of example, this is explained below on the basis of a first crossing area 20, shown in FIGS. 5a to 5c, between the longitudinal aisle L3 and the transverse aisle Q4 and on the basis of a second crossing area 21, shown in FIGS. 6a and 6b, between the longitudinal aisle L3 and the transverse aisle Q1. It can be seen from FIG. 3 that there are further identically designed crossing areas, to which the statements made with respect to the crossing areas 20, 21 apply correspondingly.

The first crossing area 20 is provided as a pure crossover crossing, in the case of which no turning into the respectively crossing storage aisle or lane is allowed.

To reliably prevent turning, a number of guiding elements 6 are installed on the crossing area 20, extending up out of the road and thereby being given their chicane-like function, which forces heavy-duty vehicles 8a, 8b, 8c entering the crossing area 20 into the desired lane and direction of travel (see cross-sectional view A-A in FIG. 5b). For this, the guiding elements 6 are dimensioned and arranged in relation to one another such that the storage aisles in the crossing area are deliberately made so narrow that turning is not possible, but instead, for collision-free operation, the crossing storage aisle or lanes must be crossed over. Provided here both between the adjacent lanes of each storage aisle is a corresponding outer guiding element 6, which, seen in the direction of the crossing lane, widens toward the storage area 5a and consequently narrows the adjoining lanes. Moreover, further guiding elements 6, for example in the form of an angle, may also be installed in the corner areas of the storage areas 5a adjoining the crossing area 20. Also in the crossing area 20, provided in the middle between the crossing lanes there is a central guiding element 6, which together with the respectively adjacent outer guiding elements 6 correspondingly narrows the lanes between the storage areas 5a. Consequently, all of the heavy-duty vehicles 8a, 8b, 8c entering the crossing area 20 are forced to cross over it without turning into a crossing storage aisle or lane, and consequently to continue traveling in the respective storage aisle.

By contrast, the second crossing area 21, shown in FIGS. 6a and 6b, is provided as a turn crossing, in particular in the form of a T crossing provided at the end of the longitudinal aisles. There, turning into a specified one of a number of crossing lanes of the crossing storage aisle is possible and required for certain lanes and directions of travel. In the present case, in a way corresponding to the circulatory operating mode intended, heavy-duty vehicles 8c leaving the longitudinal aisle L3 can only turn clockwise and only into the outer lane in the transverse aisle Q1 that is reserved for heavy-duty vehicles 8c and is at a further distance from the storage areas 5a. Therefore, guiding elements 6 comparable to the guiding elements 6 of the crossing area 20 are installed in the crossing area 21. However, here the guiding elements 6 are dimensioned and arranged in relation to one another such that the storage aisles in the crossing area 21 are deliberately made so narrow that, coming from the longitudinal aisle L3, turning into the inner lane of the transverse aisle Q1 is not possible, but instead, for collision-free operation, these lanes must be crossed over, and only subsequently turning into the outer lane is possible. From the inner lane of the transverse aisle Q1, which is reserved for heavy-duty vehicles 8a and 8b, the arrangement shown of the guiding elements 6 in the crossing area 21 means that only crossing over of the crossing longitudinal aisle L3 is possible. This also applies to heavy-duty vehicles 8c entering the crossing area 21 on the outer lane, which must not turn counterclockwise into the longitudinal aisle L3. Corresponding comments may apply to a crossing area designed analogously at the other end of the longitudinal aisle L3 with regard to entering the longitudinal aisle L3 from the transverse aisle Q5.

The crossing areas of similar transporting operations may also be designed analogously, and in particular using corresponding guiding elements 6 as a crossover crossing (for example crossings between L4 and Q2 and also L3 and Q3) or a turn crossing (for example crossings between L4 and Q1, L2 and Q2 or else L5 and Q3).

In FIG. 3, it can also be seen that, by analogy with the guiding elements 6, the already mentioned boundary elements 9 assume the function of chicane-like fixtures, and accordingly are arranged in the respective storage aisle as part of crossing areas such that a desired lane is deliberately blocked in order to prevent driving straight ahead and enforce turning into a specified storage aisle and possibly a lane.

The reduction or minimization of crossing areas of different transporting operations described above has the effect of significantly facilitating the automation of the internal transport. In preparation for mixed mode traffic comprising heavy-duty vehicles 8a and 8c, at first also only manually guided heavy-duty vehicles 8b and 8c may be used and operated with the aid of the present invention in a coordinated manner and in corresponding mixed mode traffic. These vehicles can then respectively use the correspondingly reserved lanes and, by using the invention described here, the heavy-duty vehicles 8b can subsequently be replaced by heavy-duty vehicles 8a. The fleet of internal heavy-duty vehicles can thus be completely automated. However, internal and external manually guided heavy-duty vehicles can still be used together. An already fully automatic operating area B can also be opened by the present invention for external heavy-duty vehicles 8c and supplemented by heavy-duty vehicles 8a and 8c to provide corresponding mixed mode traffic.

It is also possible that, as an alternative or in addition to the heavy-duty vehicles 8a, 8b designed as terminal trucks, straddle carrier devices are used, in the manner of straddle carriers with which both the storage and retrieval of containers in storage areas 5a of the container store 5 and the transport between the container store 5 and the container bridges 4 can take place. Furthermore, heavy-load stackers in the manner of so-called reach stackers may be used in particular as manually guided heavy-duty vehicles 8b or handling devices. Both corresponding straddle carrier devices and heavy-load stackers usually have a so-called spreader as a load receiving means for receiving containers. It is then possible to dispense with stacking cranes 7, at least in some storage areas 5a of the container store 5.

The aforementioned modular functional components can in principle be used for all of the aforementioned possible vehicle types of heavy-duty vehicles 8a, 8b, 8c, but also for handling devices such as the cranes, straddle carrier devices and heavy-load stackers mentioned. The system according to the invention with corresponding heavy-duty vehicles 8a, 8b, 8c can also be used not only as described in the present case with respect to a container terminal 1 designed as a port terminal. Rather, this is also possible when a corresponding separate operating area B is part of a Ro-Ro terminal for so-called Ro-Ro ships (abbreviation for roll-on roll-off ships, in the case of which the containers are driven onto and off the ship by means of corresponding heavy-duty vehicles), a logistical center or an industrial plant in which containers are delivered or picked up and both internal automatically guided heavy-duty vehicles 8a and, together with them, internal and/or external manually guided heavy-duty vehicles 8b, 8c are to be used in a corresponding mixed mode traffic. Instead of containers, in particular ISO containers, other normalized or standardized load units can also be handled of course, such as for example interchangeable bodies, in particular interchangeable containers or swap bodies.

The invention claimed is:

1. A system for transporting containers via heavy-duty vehicles comprising:
    at least one external heavy-duty vehicle and at least one internal heavy-duty vehicle, wherein the external heavy-duty vehicle is licensed for operation on public roads and the internal heavy-duty vehicle is not licensed for operation on public roads;
    a container store with a plurality of storage areas for containers and a plurality of storage aisles, wherein the storage aisles are disposed between the storage areas, and a crane for handling the containers;
    a separate operating area in which the heavy-duty vehicles can be operated together in a mixed mode traffic within the container store, wherein at least one first lane for the at least one external heavy-duty vehicle and at least one second lane for the at least one internal heavy-duty vehicle are reserved in the separate operating area and the first and second lanes respectively lead through a transfer area of the crane of the storage area;
    wherein the lanes are physically separated from one another, at least in certain sections, by guide elements that extend up out of the surface of the lanes;
    wherein said storage aisles cross to form crossing areas in which first and second lanes cross, and wherein said crossing areas comprise a first crossing area and a second crossing area, and wherein the guide elements are arranged such that the first crossing area is designed as a pure crossover crossing and the second crossing area is designed as a mixed crossing;
    wherein a plurality of guide elements are installed in the first crossing area that is designed as a pure crossover crossing, wherein the guide elements extend up out of the first and/or second lane and thereby force heavy-duty vehicles entering the first crossing area into a desired lane and direction of travel;
    wherein the guide elements are dimensioned and arranged in relation to one another such that the storage aisles in the first crossing area are deliberately made so narrow that turning is not possible, but instead for collision-free operation, the crossing storage aisle or crossing lanes must be crossed over;
    wherein guide elements are installed in the second crossing area that is designed as a mixed crossing, so that turning into a specified one of a number of crossing lanes of the crossing storage aisle is possible and required for certain lanes and directions of travel in the second crossing area.

2. The system as claimed in claim 1, wherein the external heavy-duty vehicle drives around clockwise in the operating area and the internal heavy-duty vehicle drives around counterclockwise in the operating area, or vice versa.

3. The system as claimed in claim 2, wherein the system comprises a fleet management system comprising a computer control system and having a wireless communication connection with the at least one internal heavy-duty vehicle and having a wireless communication connection with the at least one external heavy-duty vehicle, wherein the fleet management system electronically monitors the position of the at least one internal heavy-duty vehicle and the position of the at least one external heavy-duty vehicle via the respective wireless communication connections via which the mixed mode traffic by the heavy-duty vehicles in the separate operating area can be coordinated by continuous processing of the positions of the heavy-duty vehicles, specification of routes for the heavy-duty vehicles, and blocking of areas for the heavy-duty vehicles.

4. The system as claimed in claim 3, wherein within the separate operating area at least one of the external or internal heavy-duty vehicles comprises a manually guided heavy-duty vehicle provided with a computerized driver information system that operably communicates with the fleet management system via the respective wireless communication connection for the manually guided heavy-duty vehicle, and wherein the fleet management system is configured to provide instructions to a driver of the manually guided heavy-duty vehicle via the driver information system for the manual guidance of the heavy-duty vehicle.

5. The system as claimed in claim 1, wherein the external heavy-duty vehicle and the internal heavy-duty vehicle drive around clockwise or counterclockwise in the operating area.

6. The system as claimed in claim 5, wherein the system comprises a fleet management system comprising a computer control system and having a wireless communication connection with the at least one internal heavy-duty vehicle and having a wireless communication connection with the at least one external heavy-duty vehicle, wherein the fleet management system electronically monitors the position of the at least one internal heavy-duty vehicle and the position of the at least one external heavy-duty vehicle via the respective wireless communication connections via which the mixed mode traffic by the heavy-duty vehicles in the separate operating area can be coordinated by continuous processing of the positions of the heavy-duty vehicles, specification of routes for the heavy-duty vehicles, and blocking of areas for the heavy-duty vehicles.

7. The system as claimed in claim 6, wherein within the separate operating area at least one of the external or internal heavy-duty vehicles comprises a manually guided heavy-duty vehicle provided with a computerized driver information system that operably communicates with the fleet management system via the respective wireless communication connection for the manually guided heavy-duty vehicles, and wherein the fleet management system is configured to provide instructions to a driver of the manually guided heavy-duty vehicle via the driver information system for the manual guidance of the heavy-duty vehicle.

8. The system as claimed in claim 7, wherein the driver information system is designed as a mobile device, which is arranged at the manually guided heavy-duty vehicle before it enters the operating area and is carried along by the heavy-duty vehicle within the operating area.

9. The system as claimed in claim 7, wherein the driver information system is permanently installed at the manually guided heavy-duty vehicle.

10. The system as claimed in claim 1, wherein the system comprises a fleet management system comprising a computer control system and having a wireless communication connection with the at least one internal heavy-duty vehicle and having a wireless communication connection with the at least one external heavy-duty vehicle, wherein the fleet management system electronically monitors the position of the at least one internal heavy-duty vehicle and the position of the at least one external heavy-duty vehicle via the respective wireless communication connections via which the mixed mode traffic by the heavy-duty vehicles in the separate operating area can be coordinated.

11. The system as claimed in claim 10, wherein within the separate operating area at least one of the external or internal heavy-duty vehicles comprises a manually guided heavy-duty vehicle provided with a computerized driver information system that operably communicates with the fleet management system via the respective wireless communication connection for the manually guided heavy-duty vehicle, and wherein the fleet management system is configured to provide instructions to a driver of the manually guided heavy-duty vehicle via the driver information system for the manual guidance of the heavy-duty vehicle.

12. The system as claimed in claim 11, wherein the driver information system is designed as a mobile device, which is arranged at the manually guided heavy-duty vehicle before it enters the operating area and is carried along by the heavy-duty vehicle within the operating area.

13. The system as claimed in claim 11, wherein the driver information system is permanently installed at the manually guided heavy-duty vehicle.

14. The system as claimed in claim 11, wherein at least one of the at least one internal heavy-duty vehicles comprises an automatically guided heavy-duty vehicle provided with a sensor for object detection.

15. The system as claimed in claim 14, wherein a wireless communication connection is provided between the automatically guided heavy-duty vehicles and the fleet management system;
wherein the fleet management system electronically monitors the position of the automatically guided heavy-duty vehicle via the wireless communication connection; and
wherein the fleet management system is configured to specify the route for the automatically guided heavy-duty vehicle, wherein the automatically guided heavy-duty vehicle undergoes computer controlled navigation based on the route specified by the fleet management system via the wireless communication provided between the automatically guided heavy-duty vehicle and the fleet management system.

16. The system as claimed in claim 11, wherein the separate operating area of the system is part of a container terminal, Ro-Ro terminal, logistics center or industrial plant.

17. The system as claimed in claim 10, wherein the mixed mode traffic by the heavy-duty vehicles in the separate operating area is coordinated by the fleet management system by continuous processing of the positions of the heavy-duty vehicles and/or specification of routes for the heavy-duty vehicles and/or blocking of areas for the heavy-duty vehicles.

18. The system as claimed in claim 1, wherein at least one of the at least one internal heavy-duty vehicles comprises an automatically guided heavy-duty vehicle provided with a sensor for object detection.

19. The system as claimed in claim 18, wherein the system comprises a fleet management system comprising a computer control system and having a wireless communication connection with the automatically guided heavy-duty vehicle;
wherein the fleet management system electronically monitors the position of the automatically guided heavy-duty vehicle via the wireless communication connection; and
wherein the fleet management system is configured to specify the route for the automatically guided heavy-duty vehicle, wherein the automatically guided heavy-duty vehicle undergoes computer controlled navigation based on the route specified by the fleet management system via the wireless communication connection-is provided between the automatically guided heavy-duty vehicles and the fleet management system.

20. The system as claimed in claim 1, wherein the separate operating area of the system is part of a container terminal, Ro-Ro terminal, logistics center or industrial plant.

* * * * *

UNITED STATES PATENT AND TRADEMARK OFFICE
CERTIFICATE OF CORRECTION

PATENT NO. : 11,524,851 B2
APPLICATION NO. : 16/312783
DATED : December 13, 2022
INVENTOR(S) : Armin Wieschemann and Heiko Schulz It is certified that error appears in the above-identified patent and that said Letters Patent is hereby corrected as shown below:

In the Specification

Column 6
Line 37, insert --10-- after --delimitation--

Column 7
Line 43, insert --90-- after --by--

Column 9
Line 44, insert --17-- after --connections--

Column 13
Line 8, "llb" should be --11b--

Column 14
Line 3, insert --2-- after --quay--

In the Claims

Column 19 Claim 15
Line 18, "vehicles" should be --vehicle--

Column 20 Claim 19
Line 27, delete "-is" after --connection--
Line 29, "vehicles" should be --vehicle--

Signed and Sealed this
Thirty-first Day of January, 2023

Katherine Kelly Vidal
*Director of the United States Patent and Trademark Office*